US011042681B1

United States Patent
Lee et al.

(10) Patent No.: US 11,042,681 B1
(45) Date of Patent: Jun. 22, 2021

(54) INTEGRATED CIRCUIT COMPOSITE TEST GENERATION

(71) Applicant: Ansys, Inc., Canonsburg, PA (US)

(72) Inventors: John Lee, San Jose, CA (US); Aveek Sarkar, Palo Alto, CA (US); Altan Odabasi, Canonsburg, PA (US); Scott Johnson, Canonsburg, PA (US); Murat Becer, Canonsburg, PA (US); William Mullen, Canonsburg, PA (US)

(73) Assignee: Ansys, Inc., Canonsburg, PA (US)

( * ) Notice: Subject to any disclaimer, the term of this patent is extended or adjusted under 35 U.S.C. 154(b) by 460 days.

(21) Appl. No.: 15/928,744

(22) Filed: Mar. 22, 2018

Related U.S. Application Data

(60) Provisional application No. 62/615,039, filed on Jan. 9, 2018, provisional application No. 62/476,347, filed on Mar. 24, 2017.

(51) Int. Cl.
  *G06F 30/367* (2020.01)
(52) U.S. Cl.
  CPC ................................. *G06F 30/367* (2020.01)
(58) Field of Classification Search
  CPC ................................................... G06F 30/367
  USPC ........................................................... 703/14
  See application file for complete search history.

(56) References Cited

U.S. PATENT DOCUMENTS

| 5,179,715 | A | * | 1/1993 | Andoh | G06F 15/17337 |
| | | | | | 709/208 |
| 5,805,867 | A | * | 9/1998 | Kodaira | G06F 11/261 |
| | | | | | 703/21 |
| 6,014,512 | A | * | 1/2000 | Mohamed | G06F 30/33 |
| | | | | | 703/27 |
| 6,718,294 | B1 | * | 4/2004 | Bortfeld | G06F 11/3632 |
| | | | | | 703/20 |
| 7,100,033 | B2 | * | 8/2006 | Roth | G06F 11/2273 |
| | | | | | 709/227 |
| 7,581,087 | B2 | * | 8/2009 | John | G06F 11/2236 |
| | | | | | 703/20 |
| 7,665,002 | B1 | * | 2/2010 | White | G01R 31/318583 |
| | | | | | 714/733 |
| 7,716,031 | B2 | * | 5/2010 | Vanspauwen | G06F 13/105 |
| | | | | | 703/13 |
| 7,849,362 | B2 | * | 12/2010 | Devins | G06F 11/261 |
| | | | | | 714/25 |

(Continued)

OTHER PUBLICATIONS

Keller et al. ("Efficient Testing of Hierarchical Core-Based SOCs", IEEE, 2014, pp. 1-10) (Year: 2014).*

(Continued)

*Primary Examiner* — Iftekhar A Khan
(74) *Attorney, Agent, or Firm* — Jones Day

(57) ABSTRACT

A chip package system comprising N multiple processor cores can be tested by receiving a data file characterizing the chip package system. Thereafter, simulation testing is conducted for each core for each of $M_{i \ldots j}$ states using the data file such that each core is active in each state while all other cores are inactive. Each simulation test results in a simulation. The simulations are then combined to result in a composite test covering $M^{N*j}$ combinations. Related apparatus, systems, techniques and articles are also described.

20 Claims, 10 Drawing Sheets

(56) References Cited

U.S. PATENT DOCUMENTS

| | | | | |
|---|---|---|---|---|
| 7,873,507 B2* | 1/2011 | Tatsuoka | G06F 9/522 | 703/21 |
| 8,164,159 B1* | 4/2012 | Armstrong | H03B 5/124 | 257/531 |
| 8,396,696 B1* | 3/2013 | Ho | G06F 30/367 | 703/2 |
| 8,397,220 B1* | 3/2013 | Philipp | G06F 11/3696 | 717/135 |
| 8,522,079 B2* | 8/2013 | Liao | G06F 11/3656 | 714/27 |
| 8,589,133 B1* | 11/2013 | Dalessandro | G06Q 10/00 | 703/8 |
| 8,639,487 B1* | 1/2014 | Ezer | G06F 30/327 | 703/14 |
| 8,725,485 B2* | 5/2014 | Tatsuoka | G06F 11/36 | 703/15 |
| 8,738,860 B1* | 5/2014 | Griffin | G06F 13/4022 | 711/122 |
| 8,825,465 B2* | 9/2014 | Cho | G06F 30/3312 | 703/21 |
| 8,826,208 B1* | 9/2014 | Saha | G06F 30/398 | 716/111 |
| 9,207,977 B2* | 12/2015 | Easwaran | G06F 9/4887 | |
| 9,612,868 B2* | 4/2017 | Easwaran | G06F 9/4887 | |
| 10,068,039 B1* | 9/2018 | Vennam | G06F 30/392 | |
| 10,365,947 B2* | 7/2019 | Sprague | G06F 9/48 | |
| 10,445,445 B2* | 10/2019 | Petras | G06F 9/45508 | |
| 2006/0004988 A1* | 1/2006 | Jordan | G06F 9/3851 | 712/43 |
| 2006/0212677 A1* | 9/2006 | Fossum | G06F 9/5027 | 712/1 |
| 2007/0226795 A1* | 9/2007 | Conti | G06F 21/554 | 726/22 |
| 2008/0148015 A1* | 6/2008 | Takamoto | G06F 11/2043 | 712/203 |
| 2008/0162770 A1* | 7/2008 | Titiano | G06F 1/324 | 710/309 |
| 2008/0228971 A1* | 9/2008 | Rothman | G06F 9/45558 | 710/104 |
| 2009/0055826 A1* | 2/2009 | Bernstein | G06F 9/3891 | 718/102 |
| 2009/0172228 A1* | 7/2009 | Zimmer | G06F 9/4812 | 710/260 |
| 2009/0309243 A1* | 12/2009 | Carmack | G06F 1/3203 | 257/798 |
| 2010/0271144 A1* | 10/2010 | McCorquodale | H03B 5/04 | 331/117 FE |
| 2010/0287429 A1* | 11/2010 | Maruyama | G01R 31/318547 | 714/728 |
| 2012/0319789 A1* | 12/2012 | Bhowmik | H03K 3/0231 | 331/143 |
| 2013/0003310 A1* | 1/2013 | Raj | H05K 7/1092 | 361/718 |
| 2013/0054940 A1* | 2/2013 | Wang | G06F 9/30174 | 712/205 |
| 2013/0339917 A1* | 12/2013 | Darringer | G06F 30/398 | 716/120 |
| 2014/0114636 A1* | 4/2014 | Daloukas | G06F 30/367 | 703/14 |
| 2014/0192583 A1* | 7/2014 | Rajan | G11C 5/06 | 365/63 |
| 2015/0008957 A1* | 1/2015 | Olgiati | G01R 31/3177 | 326/38 |
| 2017/0285699 A1* | 10/2017 | Ahuja | G06F 1/3296 | |
| 2018/0059757 A1* | 3/2018 | Ananthakrishnan | G06F 1/324 | |
| 2018/0060085 A1* | 3/2018 | Ananthakrishnan | G06F 12/0897 | |
| 2018/0210747 A1* | 7/2018 | Smith | G06F 9/50 | |

OTHER PUBLICATIONS

Heirman et al. ("Power-Aware Multi-Core Simulation for Early Design Stage Hardware/Software Co-Optimization", ACM, 2012, pp. 1-10) (Year: 2012).*

Carlson et al.("Sniper: Exploring the Level of Abstraction for Scalable and Accurate Parallel Multi-Core Simulation", IEEE, 2011, pp. 1-12) (Year: 2011).*

Cheng et. al. ("Worst Case Switching Pattern for Core Noise Analysis", DesignCon 2009, pp. 1-15) (Year: 2009).*

* cited by examiner

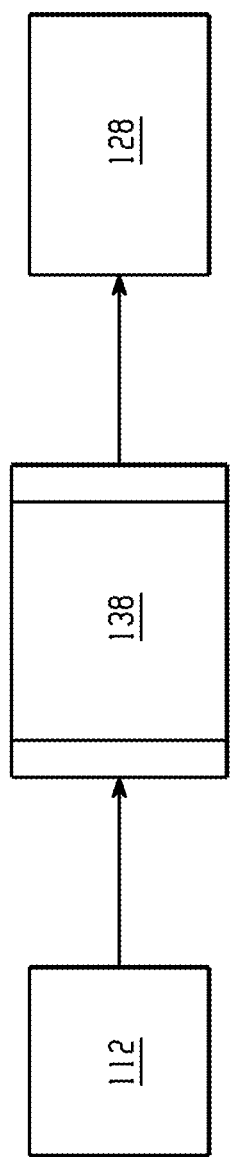

INTEGRATED CIRCUIT COMPOSITE TEST GENERATION

CROSS REFERENCE TO RELATED APPLICATIONS

This application claims priority to U.S. Provisional Patent Application No. 62/476,347, filed Mar. 24, 2017, the entirety of which is herein incorporated by reference. This application also claims priority to U.S. Provisional Patent Application No. 62/615,039, filed Jan. 9, 2018, the entirety of which is herein incorporated by reference.

TECHNOLOGICAL FIELD

The invention resides in the field of computational integrated circuit structure study, design, and testing.

BACKGROUND

In particular, a the technological field of computational integrated circuit study, design, and testing includes activities such as modeling of integrated circuits and the generation of tests for efficiently characterizing integrated circuits and to the application of tests to models of an integrated circuit in order to study and characterize a physical embodiment of an integrated circuit or the behavior thereof using a computer.

A number of methods are known for modeling and testing integrated circuits. Computational integrated circuit studies, designs, and tests necessarily rely on simulators. Known simulators are typically special purpose computers, or general purpose computers, executing specialized software instructions that allow limited computer resources to address the highly complex calculations necessary to model an integrated circuit and simulate its behavior. These software instructions may involve many specific routines and shortcuts that allow the limited resources of a computer to accurately predict the physical (e.g. electrical, thermal, mechanical, motion) behavior of physical integrated circuit components. One property of integrated circuits, the understanding of which is known to be useful in designing and optimizing integrated circuit design is power rail collapse, which can arise as high frequency operations create parasitic inductances in various signal paths that lead to a significant drop in power supply voltage when switching. This in turn can cause logic errors. Because an integrated circuit, once formed, is often a monolithic device, it cannot be deconstructed to allow for invasive testing in order to study and understand its behavior, e.g. to identify the source of logic errors arising within it. Instead, it is only through the use of simulators that an integrated circuit can be studied and its behavior tested.

The increasing adoption of multi-core processors within integrated circuits has, in turn, also increased the complexity of systems and techniques for modeling such integrated circuits when they are being designed. Practically speaking, the complexity of modern multicore processors has rendered known modeling and testing techniques prohibitively complicated. For example, the combination of all various switching scenarios for a chip package system having 8-32 central processing unit (CPU) cores can require hours, and sometimes days, to process (thereby consuming significant computing resources). Further, known methods of identifying which testing simulation scenarios are appropriate for any given chip package configuration are often merely guess work, thus necessitating the execution of all or numerous scenarios which are often duplicative in nature or irrelevant to the end product configuration. These factors increase the amount of time and resources required to prototype or otherwise characterize new integrated circuit designs. Aside from increasing the computational power (in terms of speed, frequency, and memory sizes) only improvements to the software techniques that enabling a simulator can create improvement in this technological field.

SUMMARY

In one aspect, a chip package system comprising N multiple processor cores can be tested by receiving a data file characterizing the chip package system. Thereafter, simulation testing is conducted for each core for each of $M_{i \ldots j}$ states using the data file such that each core is active in each state while all other cores are inactive. Each simulation test results in a simulation. The simulations are then combined to result in a composite test covering $M^{N*j}$ combinations.

In interrelated aspects, simulation testing includes generating a computer readable model of the chip package system from the data file. And, applying a first set of switching combinations causing first one or more of $M_{i \ldots j}$ states and capturing first one or more physical characteristics of the behavior of the chip package in response to the first one or more of $M_{i \ldots j}$ states. Simulation testing also may include storing the first one or more physical characteristics in a data store. And applying a second set of switching combinations causing second one or more of $M_{i \ldots j}$ states and capturing second one or more physical characteristics of the behavior of the chip package in response to the second one or more of $M_{i \ldots j}$ states. And storing the second one or more physical characteristics in the data store. The simulation outputs may be combined to obtain a composite test covering $M^{N*j}$ combinations comprises:

combining one or more of the first one or more physical characteristics of the behavior of the chip package with one or more of the second one or more physical characteristics of the behavior of the chip package to obtain a composite test.

In embodiments, the simulations can be linearly superimposed and/or non-linearly superimposed. And simulation testing may be conducted such that all N cores are inactive to result in a further simulation to form part of the combined simulations. The simulation testing may vary different logic for the chip package system. The simulation testing may run through different switching time combinations for the chip package system. The testing may result in a leakage analysis. Peak to peak voltages and/or a level of noise may be calculated for each simulation. The multiple processor cores can form part of a single processor and/or they can form part of two or more processors. The data file may be a value change dump (VCD) file, a logical netlist, and/or a layout file.

In embodiments, the composite test can be executed and data characterizing same can be provided. The providing of data can include at least one of: causing the data characterizing the executed composite test in an electronic visual display, transmitting the data characterizing the executed composite test to a remote computing system, loading the data characterizing the executed composite test into memory, or storing the data characterizing the executed composite test into physical data storage.

The conducted simulation testing can include testing criteria such as simultaneous switching current localization, power grid weakness, current supply congestion, or timing critical path impact, electrical conductivity to nearest package bump, power density, thermal density, change in demand current over time, component sensitivity to noise, number of logic gates, number of memory cell switching, number of cell switching, and/or whether every block is activated.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables more rapid design prototyping of integrated circuits by providing composite testing that more comprehensively characterize such integrated circuits.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1C is an illustration of a modelling process in accordance with various embodiments.

FIG. 1E illustrates aspects of composite test generation in accordance with various embodiments.

FIG. 1F illustrates aspects of composite test generation in accordance with various embodiments.

DETAILED DESCRIPTION

Figure 1A:
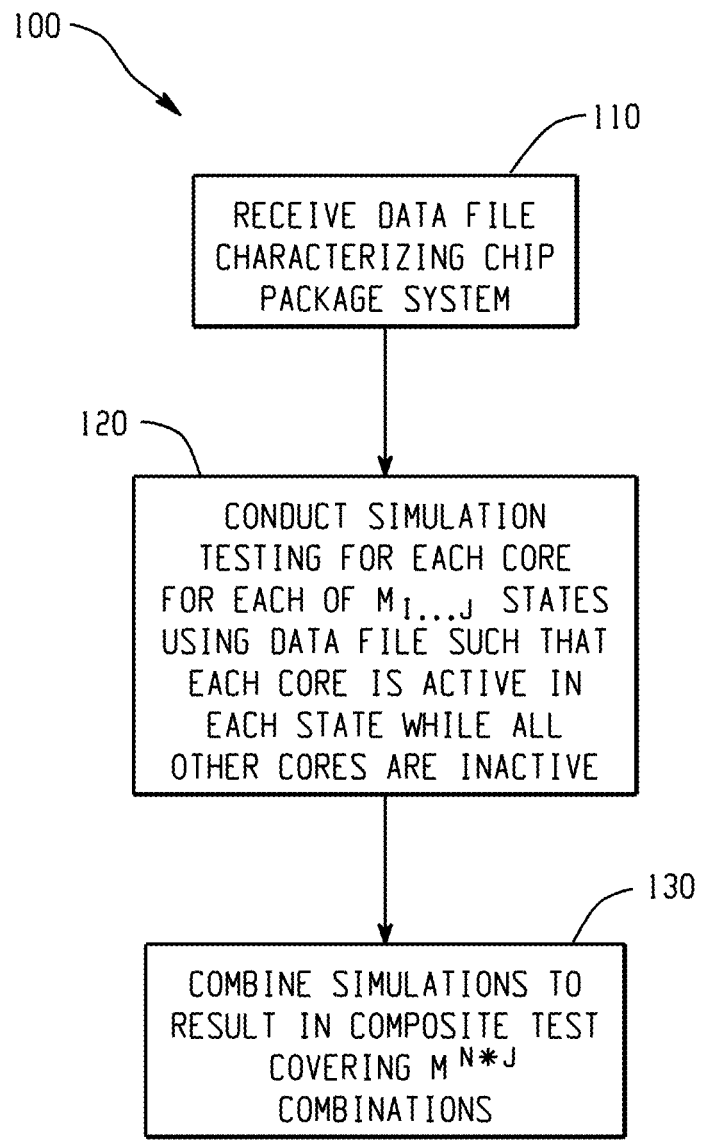
FIG. 1A is a process flow diagram illustrating the generation of a composite test for characterizing a chip package system in accordance with various embodiments.

The current subject matter is directed to enhanced computational integrated circuit simulation techniques for modeling integrated circuits and generating simulation testing for integrated circuit systems (referred to herein sometimes simply as "chips") which, in turn, allow for enhanced design prototyping. In particular, applying techniques in accordance with this disclosure, integrated circuits, such as CPU/GPU clusters or system on a chip (SoC) designs, can be rapidly evaluated for thousands of switching states in a matter of minutes, where known simulators and simulation techniques can take on the order of days. Evaluating switching states allows for voltage and current patterns arising from switching states to be analyzed for different logic and switching time combinations. The resulting evaluations are useful for investigating integrated circuit performance outliers (e.g., in order to check if such combinations can occur). The resulting evaluation can also be used to design mechanisms for preventing switching combinations that generate an undesirable amount noise. These resulting evaluations can also be used to identifying which chip and integrated circuit package combination drive most resonance condition.

Time domain (or transient) analyses methods have complemented and in many cases superseded traditional static (DC) and AC (frequency domain) techniques that were considered appropriate for chip and chip-package power delivery network (PDN) designs; until recently these techniques allowed sufficient study to evaluate critical criteria prior to committing a design for a manufacturing process. Transient simulation methods allowed chip or chip-package-PCB engineers to model the impact of simultaneous switching current, inductance/capacitance and other time-varying physical effects (e.g, electro-magnetic effects). With the use of power gates, on-chip regulators, dynamic voltage scaling and other advanced techniques, transient simulations for modeling transient electrical effects have become a critical criteria for study and sign-off prior to committing a chip package design to manufacture, or for incorporating a chip package model into wider system study and analysis. Prior to such commitment, studies are typically evaluated to ensure that a modelled chip package does not result in violation conditions (e.g., excessive noise, over voltages, over currents, rail collapse) or logic errors.

As chip packages become increasingly more complex, transient simulations that attempt a full-chip analysis suffer from limitations when modeling and simulating chip behavior, and require the addition of substantial margin in performance evaluations in order to obtain sufficient confidence in critical criteria evaluation studies prior to commitment. As multi-core design complexity escalates, such approaches however are inherently limiting. As the number of cores is expected to continue to scale increasingly upward the critical criteria for design commitment is fundamentally different. The concerns of a package designer become less a matter of how well the power grid is designed inside a chip package, or inside an individual CPU core, or at a higher re-distribution (RD) layer. Instead, concerns are predominantly focused on rail collapse or bounce that can happen when multiple cores are switching in different modes or at different times.

Critical criteria for testing may further include criteria such as: simultaneous switching current localization, power grid weakness, current supply congestion, or timing critical path impact, electrical conductivity to nearest package bump, power density, thermal density, change in demand current over time, component sensitivity to noise, number of logic gates, number of memory cell switching, number of cell switching, or whether every block is activated.

In embodiments a mode may be a high activity mode and another mode may be a low activity mode. In embodiments modes may be associated with different switching or signal frequencies within a core. In embodiments a first and second processor core each operate in a high activity mode, while a third and fourth process operate in a low activity mode giving rise to a first set of simulation results for an encompassing chip package. In a second test, the first and second processor cores operate in a low activity mode while the third and fourth processors operate in a high activity mode giving rise to a second set of simulation results for the encompassing chip package that is different from the first set, even though each of the processor cores themselves may be of a similar design. It will be appreciated in embodiments there may be many modes in which any individual processor core may operate. It will also be appreciated that a chip package may have a different number of processor cores (e.g. in an embodiment a CPU has eight cores, and in another embodiment a GPU may have over 1000 processor cores in an integrated package. Because each processor core may execute a distinct thread, each processor my operate in a particular mode at any point in time.

Based on circuit geometry, physical layout, as defined by a chip package's architecture, and the materials and techniques involved in the manufacturing process, each processor core's mode of operation, and the parasitic effects associated with it may differ in various physical locations across a package. For example, in embodiments a first process core operating in an active mode may give rise to parasitic effects in a first physical region of the chip package, while a second processor core operating in an active mode may give rise to different parasitic effects in a second region, but not in the first region. The interaction of between switching with a package's architecture, and parasitics, in the form of parasitic resistances, parasitics inductances, and parasitic capacitances (RLC) dictate various phenomena within a chip package, for example the power supply noise a package experiences. This in turn directly affects the viable operating speeds and functional capabilities of a device.

To simulate multi-core switching (along with the package/PCB parasitics), existing methods cannot feasibly scale to covers the increasingly large number of different scenarios that can exist when attempting to evaluate every possible switching combination across each processor core in a chip package (e.g. a full scale chip analysis).

Embodiments in accordance with this disclosure provide a chip-package designer sufficient flexibility to allow evaluate the switching of a multi-core sub-system and its impact on the power supply without having to perform individual time-consuming full-chip capacity scale transient simulations for every combination of switching inputs, or every combination of operational modes. Because of the complex electromagnetic interplay between separate signals and separate components of an integrated circuit, seemingly small changes occurring in a first physical location of an integrated circuit can give rise to significant structural and physical changes in locations of the integrated circuit that are remote from the first location. As system operating frequencies and signal edge rates continue to increase, signal corruption in the form of crosstalk, transients, and noise in power delivery systems are becoming more and more limiting factors in the performance of electronic packaging. It is physically impossible to study and evaluate this behavior in modern integrated circuit packages, which may involve as many as billions of components, each of which may change state in response to a single signal edge propagating through the package, without the use of specialized software executing on a computer processing machine.

FIG. 1A-E illustrate various aspects of systems and methods for computational modeling of integrated circuits. FIG. 1A is a process flow diagram 100 for generating a composite test for a chip package system using a computer based software simulator. Initially, at 110, a data file, e.g. 112, is received that characterizes the chip package system, e.g. chip package 102. The data file, e.g. 112, can take various forms and be one or more of: a value change dump (VCD) file, a logical netlist, and/or a layout file. A data file such as data file 112 may be generated by a characterization process, e.g. 116. Characterization process 116 may be a system design software package in which a chip package designer utilizes a CAD interface to create a computer based design model of a physical chip package, e.g. 102.

In embodiments, a data file, e.g. 112, describes a system on a chip (SoC), e.g., 102, integrated with N processors (e.g. six processors 104a-104d). In embodiments the chip package includes one or more memories, e.g. shared memory 106. The chip package may also include an I/O port, e.g. port 108, for connecting to a network, or remote data storage, or one or more additional chip packages within a wider system. Chip package may further include various additional circuitry or physical components, e.g. components 112, that rely on, or interact with, the N processors. Each of components of a SoC, e.g. components 104a-d, 106, 108, 112 of SoC 102, may communicate and route signals between various components across one or more busses, e.g. bus 114.

Thereafter, at 120, simulation testing can be generated for each of N cores for each of $M_{N0 \ldots Nj}$ states using the data file such that each core is active in each state while all other cores are inactive, a state $M_{Ni}$ may correspond to a particular switching combination for a particular core. Each such simulation test results in a simulation with a simulation output. A simulation output describes the overall chip package response in response to each state $M_{Ni}$ of a particular core caused by each switching combination tested. Thus in embodiments, for N cores, a first simulation output $S_0$ is generated by applying states $M_{00}$-$M_{0j}$ to a first processor core. The first simulation output $S_0$ may be stored in any suitable data store (e.g., memory, cache, persistent data storage, remote data store) for later access. Then a second simulation output $S_1$ is generated by applying states $M_{10}$-$M_{1j}$ to a second processor core, and $S_1$ is likewise stored. This is repeated for each processor core until a simulation $S_0$-$S_N$ is obtained and stored for each of the N cores.

In embodiments, simulation testing may include generating a model of the chip package system, e.g. 102. Upon receiving a data file, e.g. 112, in step 110, a modelling aspect, e.g. 138, of the software simulator may generate a model, e.g. computer readable model 128, of the chip package system, e.g. a model of package 102, based on the data file, e.g., 112. Such a model, e.g. 128, may be held in a memory or a persistent data store or any suitable storage, local or remote. Such a model may be configured to take, or be combined with, an input in the form of switching combinations, e.g. switching combinations input 122a, to generate a simulation output, e.g. simulation output 124a, that describes the behavior of model 128 in response to a set of switching inputs, e.g. 112a, that activate a particular process core, e.g. 104a, to cause one or more states that correspond to a particular switching input.

In embodiments the switching inputs 122a-122d include sufficient switching combinations to cause model 128 to experience each of $M_{N0 \ldots Nj}$ states of a particular processor core N. An input, e.g., 122a, may also include a set of time offsets that describe how switching inputs are applied to a model to simulate a time varying switching input. In this way particular switching inputs may be simulated to occur according to various time offsets, which may give rise to additional states. Each input, e.g., 122*a*, may include one or more additional parameters. In embodiments, the additional parameters include an identification of which processors is targeted for switching by corresponding switching combinations. Additional parameters may include any suitable condition or additional input signals necessary or useful for simulating behavior of model 128.

Each simulation output, e.g., simulation outputs 124*a*-124*d*, may include, for example, a generated noise floor associated with a PDN operating in each of one or more states arising from various switching combinations. Or the simulation may include an evaluation of parasitics, transients, or signal propagation timing, or over currents, arising in each state. Alternatively, simulation output 124*a* may include an encoded output describing the physical behavior of a corresponding modeled device, e.g. the behavior of SoC 102, while a single core, e.g. 104*a*, is subjected to various switching combinations; such an encoded output may then be analyzed or studied to obtain the desired parameters (e.g., parasitics, transients, signal propagation, over currents). In embodiments, for each switching combination provided by a simulation input, e.g. 122*a*, corresponding package behavior (e.g. currents, voltages, transients, parasitics) is generated in simulation output 124*a*. Thus, output 124*a* may include one or more first entries describing a first behavior in response to a first switching combination applied to a first core 104*a*. And output 124*a* may include one or more second entries describing a second behavior in response to a second switching combination applied to a first core, e.g. 104*a*. Thus, a future analysis based on many simulation outputs, e.g. 124*a*-124*d*, may selectively combine either a first behavior or a second behavior from a first simulation output, e.g., 124*a*, with selected behaviors from a second simulation output, e.g., 124*b*.

Figure 1B:
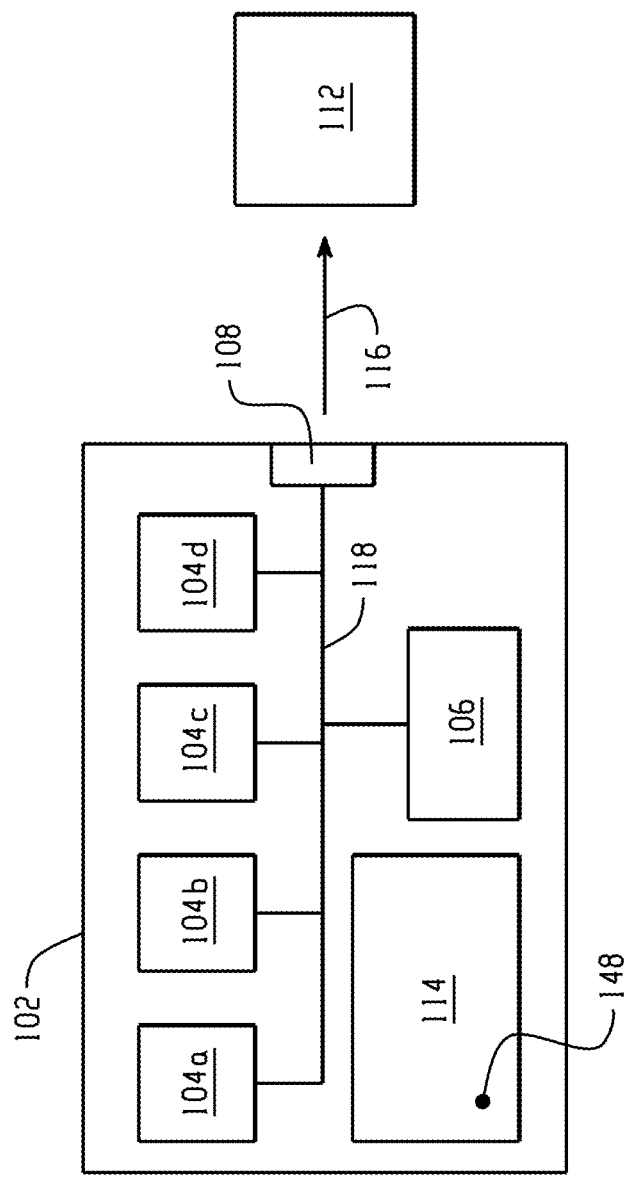
FIG. 1B is a an illustration of a chip package characterization process in accordance with various embodiments.

For example, FIG. 1B illustrates an exemplary SoC 102. SoC 102 includes four processors 104*a-d*, that communicate and interact with various circuitry 114 and memory 106 across bus 118. SoC 102 includes a port 108 for external communications. SoC 102 is characterized according to a characterization process 116 to generate a descriptive data file 112. FIG. 1C illustrates an exemplary process of receiving a descriptive data file 112, e.g., a netlist, a VCD, or a layout file, into modeling aspect 138 of a simulator software package. Modeling aspect 138 receives data file 112 to generate a computer readable model 128 that describes SoC 102. This model 128 may be stored in any suitable storage accessible by a simulator software package executing on one or more computer processing machines.

Figure 1D:
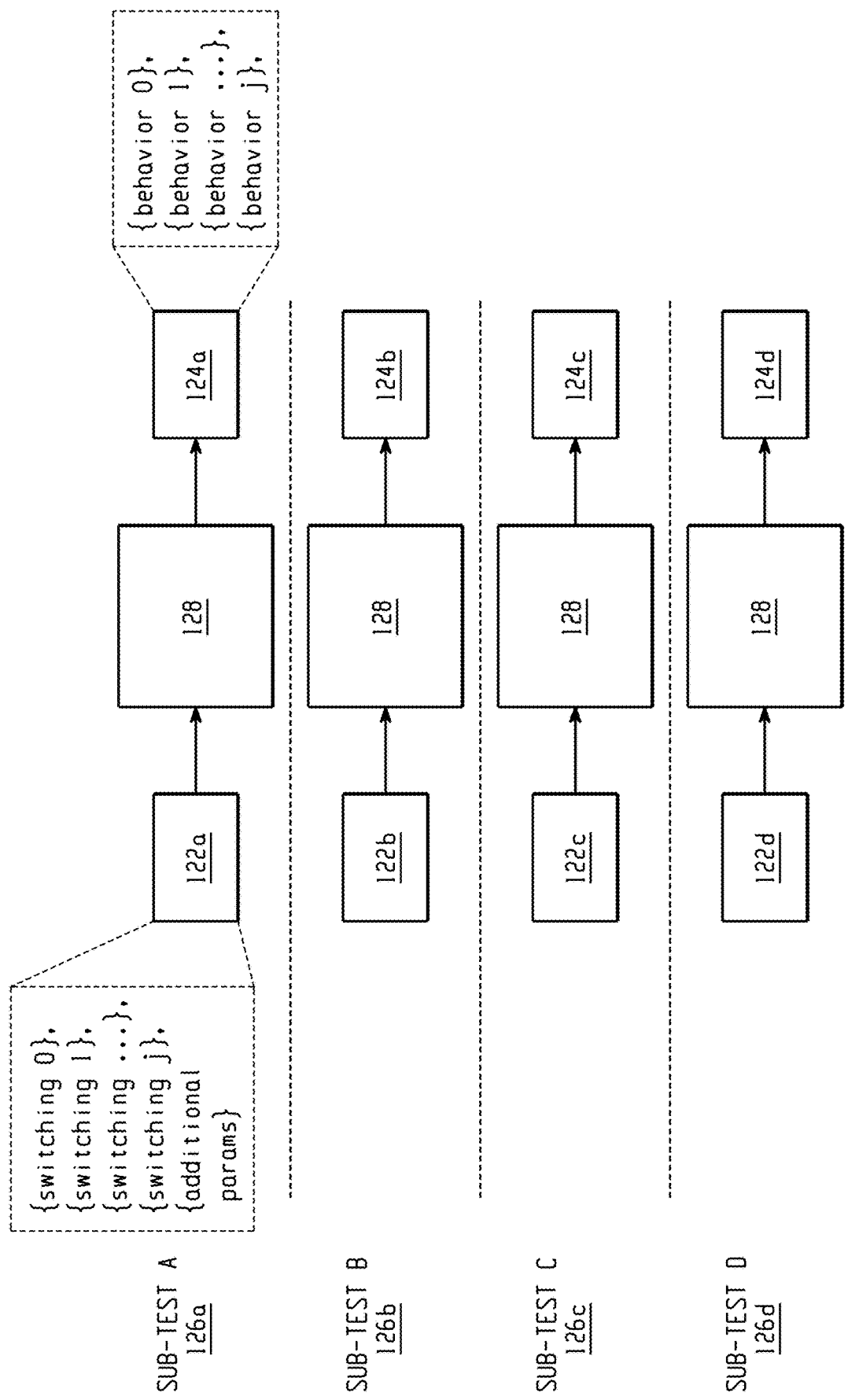
FIG. 1D is an illustration of sub-tests in accordance with various embodiments.

FIG. 1D illustrates various sub-tests, e.g. sub-tests 126*a*-126*d*, in accordance with embodiments. In sub-test A, 126*a*, a simulator input 122*a* is received and applied to model 128 to obtain simulator output 124*a*. Simulator input 122*a* may include various switching states. Switching input 122*a* may include switching combinations 0-j (this is illustrated in FIG. 1D for switching input 122*a* only for simplicity of illustration, but it should be understood that each of input 122*a*-122*d* likewise includes a set of switching inputs). Switching inputs 122*a*-122*d* may include the same switching input combinations, or each may include a distinct set of switching inputs for each particular core tested.

Simulator input 122*a*, as discussed above, includes switching combinations, timing offsets and one or more other additional parameters. One additional parameter may include a parameter identifying a target processor core 104*a* of model 128 for switching. Thus, output 124*a* includes simulated device behavior responsive to the switching combinations, timing offsets, and other parameters of input 122*a*, as applied to core 104*a*. In sub-test B, 126*b*, a simulator input 122*b* is received and applied to model 128 to obtain simulator output 124*b*. Simulator input 122*b*, as discussed above, includes switching combinations, timing offsets and one or more additional parameters. One additional parameter includes a parameter targeting processor core 104*b* for switching. Thus, output 124*b* includes simulated device behavior responsive to the switching combinations, timing offsets, and other parameters of input 122*b*, as applied to core 104*b*. In sub-test C, 126*c*, a simulator input 122*c* is received and applied to model 128 to obtain simulator output 124*c*. Simulator input 122*c*, as discussed above, includes switching combinations, timing offsets and one or more additional parameters. One additional parameter includes a parameter targeting processor core 104*c* for switching. Thus, output 124*c* includes simulated device behavior responsive to the switching combinations, timing offsets, and other parameters of input 122*c*, as applied to core 104*c*. In sub-test D, 126*d*, a simulator input 122*d* is received and applied to model 128 to obtain simulator output 124*d*. Simulator input 122*d*, as discussed above, includes switching combinations, timing offsets and one or more additional parameters. One additional parameter includes a parameter targeting processor core 104*d* for switching. Thus, output 124*d* includes simulated device behavior responsive to the switching combinations, timing offsets, and other parameters of input 122*d*, as applied to core 104*d*. In each case, simulator outputs 124*a*-124*d* may include a description or characterization of simulated behavior for each corresponding switching input. For example, in one embodiment, simulator output 124*a* includes behavior 0 through behavior j corresponding to input switching combinations 0-j. In embodiments, behaviors may include an output sequence of time correlated data points for a plurality of physical locations sampled throughout the SoC 102. In embodiments, these data points correlating to physical locations are indexed in like manner in each of simulator outputs 124*a*-124*d* so as to simplify later simulation computations.

Later, at 130, the simulations are combined to result in a composite test covering $M^{N*j}$ combinations (which can later be executed). For example, in embodiments, the simulation outputs are combined through the principle of linear superposition to generate a composite test result, e.g. 132*a*, as illustrated in FIG. 1E. In other exemplary embodiments, the simulation results, e.g. 124*a*-124*d*, are combined in a non-linear fashion. For example, a composite test result may be the result of a non-linear function $F_{nl}$ that operates on simulation outputs, e.g. 124*a*-124*d*, as illustrated in FIG. 1F. In embodiments, each individual recorded behavior output from a simulation output, e.g. 124*a*, may be evaluated (combined) with each recorded behavior from each other simulation output, e.g. 124*b*. Alternatively, selected behavior outputs in each simulated output may be selectively combined. For example, if switching combination 1 of simulation input 122*a* results in a behavior 2 recorded in simulation output 124*a* that exceeds certain thresholds, or encounters selected conditions, behavior 2 of output 124*a* alone may be selectively combined with one or more other selected behaviors captured in each other simulation output, e.g. 124*b-d*.

Figure 2:
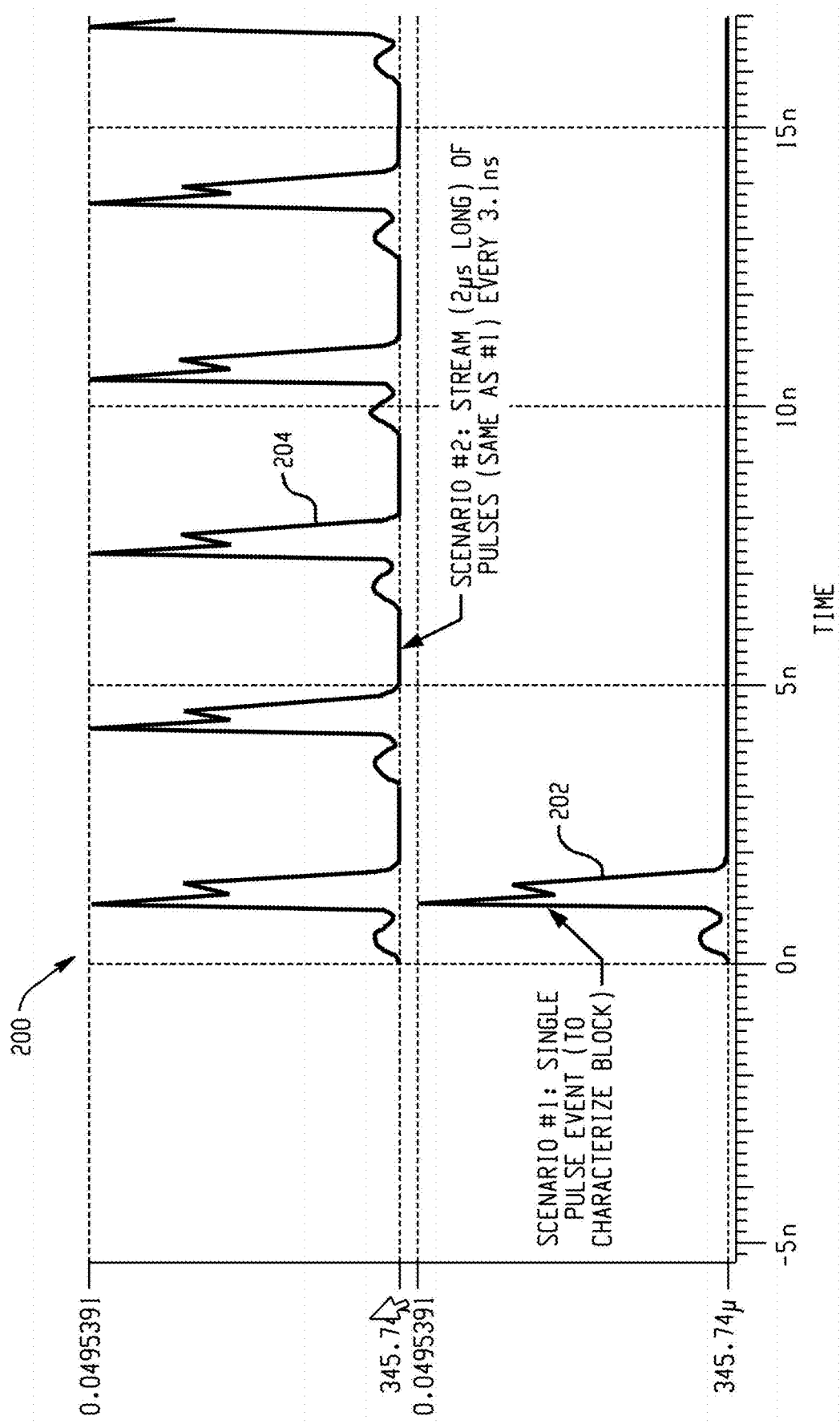
FIG. 2 is a diagram illustrating the results of experimental switching currents in accordance with various embodiments.

FIG. 2 is a diagram 200 illustrating two exemplary experimental switching scenarios, 202 and 204. In a first switching combination 202, a first modeled block is switched a single time, e.g. switching input, and a corresponding simulated voltage is measured at a particular modeled location within a corresponding modeled chip package to obtain a behavior waveform (not particularly illustrated) in response to that switching current at a particular location within the tested package. For example, first switching combination may be applied to an input of a first processor core, e.g. 104a in a model 128 of chip package 102, causing a behavior waveform at a particular test location, e.g. test point 148 in a model 128 of chip package 102. This behavior waveform may be stored as a first behavior in a simulation output data structure, e.g. 124a. It will be appreciated that a first switching scenario may also include many additional switching signals occurring according to one or more time offsets, causing many additional behavior waveforms at the tested point. It will also be appreciated that many additional test points may be evaluated for each input switching combination. Thereafter, in a second switching combination 204, the same block (e.g., of processor core 104a) is switched by repeating the same current every 3.1 ns, and a second behavior response waveform (not particularly illustrated) is generated corresponding to the same physical location in the package, e.g. test point 148 of model 128 of chip package 102, in response to the second input switching combination. It will similarly be appreciated that a second switching scenario may also include many additional switching signals occurring according to one or more time offsets. The second behavior waveform is also stored in the corresponding simulation output data structure, along with any additional behavior waveforms for any additional test points observed. In embodiments, many additional switching scenarios may be tested and corresponding behavior for each scenario at each selected modeled location within the chip package is stored in a corresponding simulation output data structure.

While switching combinations may be described as one or more vectors, but there has been a move away from vector testing towards analog-based (vectorless) device-pin testing for digital devices. This trend is a result of the difficulty in accurately and efficiently testing high speed, low voltage, devices with vector inputs. Instead, analog open vectorless tests are relied upon to verify that a tested component does not suffer from structural defects. Thus, in embodiments, a switching combination may include a vectorless analog opens input instead of digital vectors as inputs.

Figure 3:
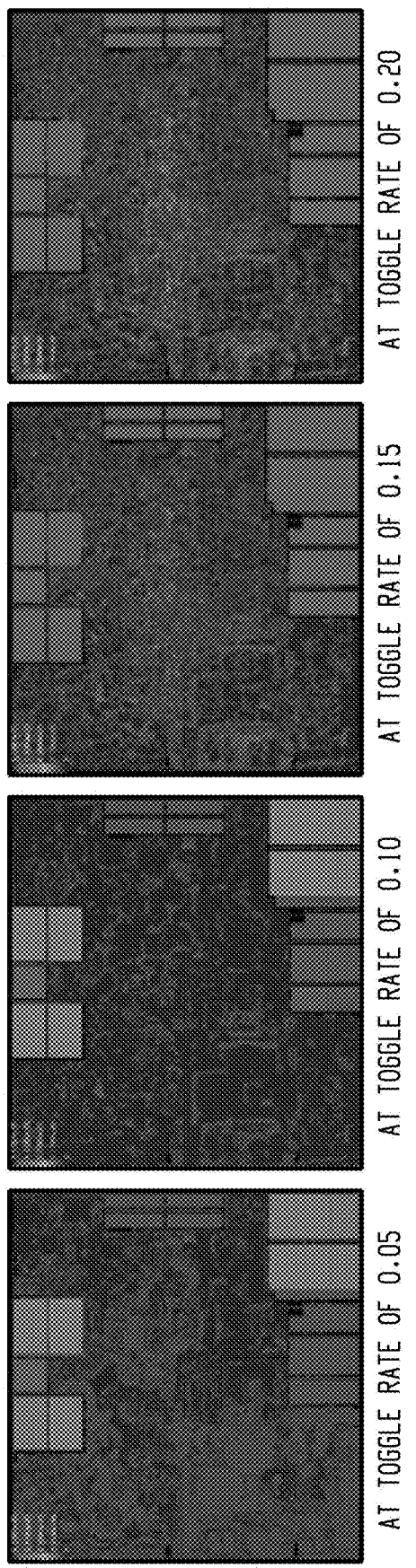
FIG. 3 is a diagram illustrating results at different toggle rates.

FIG. 3 is a diagram 300 illustrating a power density map for a modeled CPU core subjected to various vectorless switching conditions. With this arrangement, the CPU core (master) was run standalone in response to various vectorless conditions. Each scenario was dumped as fast signal database (FSDB) to be used to drive a top level characterization. Such an arrangement is advantageous in that it ensures all instances of the master use the same switching scenarios. As shown in FIG. 3, for four scenarios subjecting the CPU core (master) to four switching conditions, four unique FSDBs were created. In embodiments the four unique FSDBs may be four separate simulator outputs, or a single simulator output may include all four unique FSDBs generated by applying the four switching conditions to the CPU core (master). In one example, the time required for this simulation was approximately 30 minutes with sixteen workers threads were employed achieving peak memory usage of approximately 24 GB for each worker and a resulting DB Size of approximately 99 GB.

Figure 4:
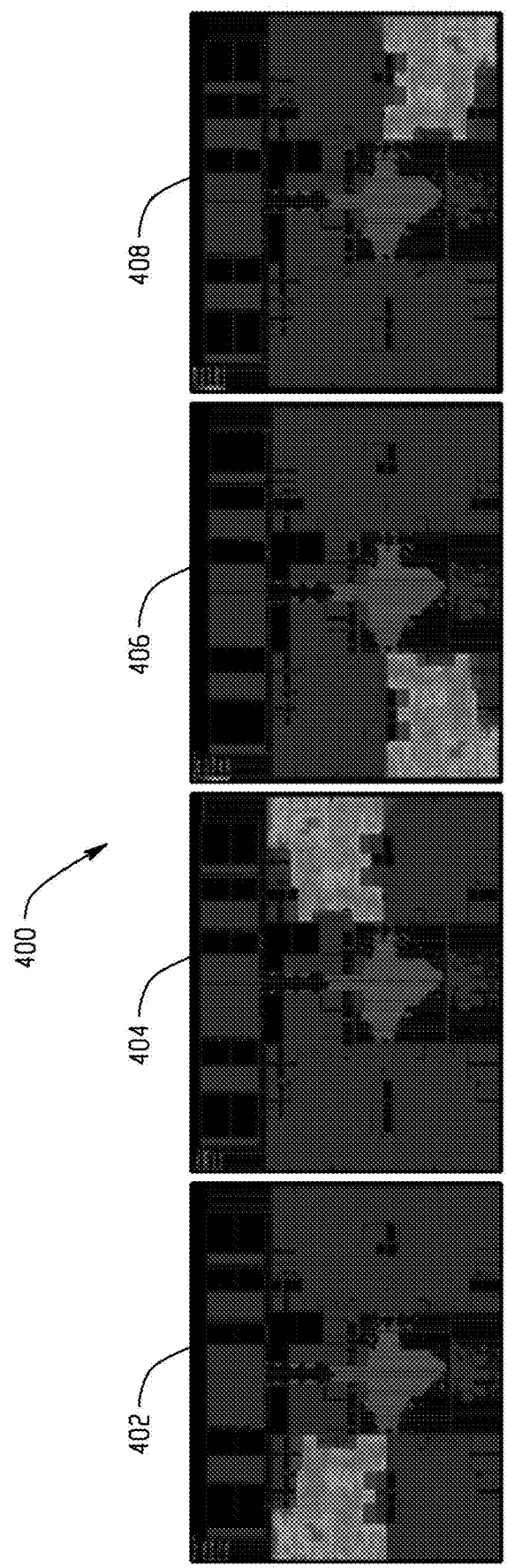
FIG. 4 is a diagram illustrating views of simulations at a constant toggle rate.

FIG. 4 is a diagram 400 illustrating a characterization step in which each CPU core was simulated in the context of a four core cluster, that is a chip package having four processor cores. For example, with 'M' scenarios for the 4 identical blocks, 4 simulation results with M recorded behaviors were created (i.e., 4 cores×4 scenarios=16 behaviors in total, stored in four simulator output structures (or alternatively, in one simulation output that is appropriately indexed for later identifying and retrieving desired simulation output behaviors)). All simulations illustrated were performed without considering leakage. That is no leakage was assumed. In other embodiments, particular simulations may obtain results for target cells in an IC package, e.g. top level cells only. In embodiments, a leakage only mode may be evaluated to evaluate unintended power consumed by the chip package that does not contribute to the integrated circuit chip package's desired functionality. This leakage current may arise from one or more parasitics (RLC) effects that arise in a particular switching combination, or one or more localized variations.

Each characterization depicted in FIG. 4 was obtained by performing a simulation of various switching combinations, each for a twenty four nanosecond duration with 50 picosecond resolution (simulation period). The eighteen analysis views were created in approximately nine hours with 24 worker threads, with a peak memory usage of approximately 25 GB for each worker thread, and a resulting DB size of approximately 500 GB.

Figure 5:
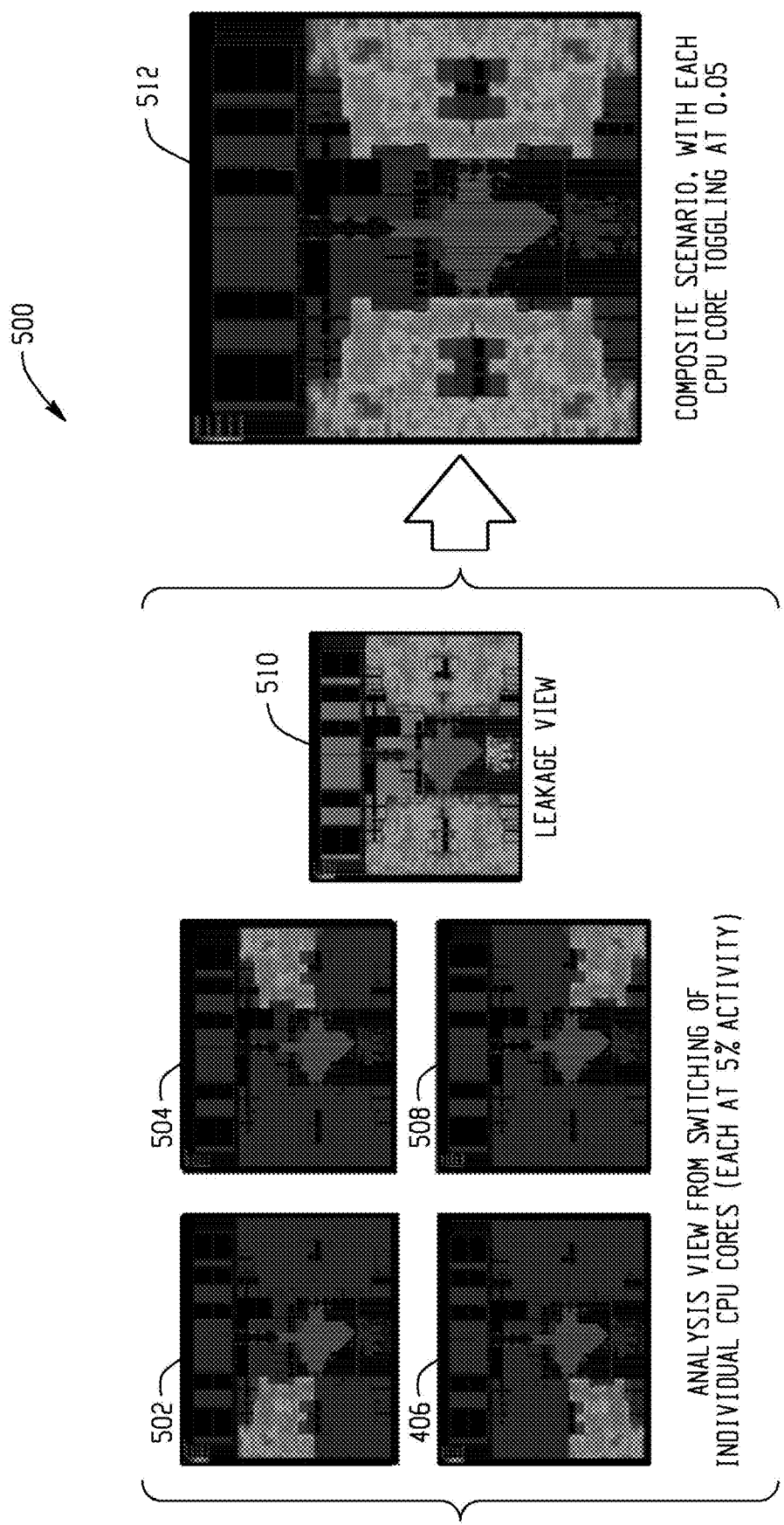
FIG. 5 is a diagram illustrating a view of a composite test/scenario.

FIG. 5 is a diagram 500 illustrating four combined simulated behavior characterizations 502, 504, 506, 508, in which, with N cores each with M states, there are a total of $M^N$ switching states at top level. In the example depicted, each depicted combined simulated behavior 502, 504, 506, 508 includes behavior for one of four cores that each have four states, resulting in 256 behaviors combined using superposition to obtain 4 combined test results. The total time to run the composite test is less than ten hours using 24 CPU cores. Also depicted is a combined leakage test comprising leakage simulation results for each of the resulting 256 behaviors. Composite scenario 512 comprises a combination of behavior characterizations 502, 504, 506, 508 with leakage combination 510, illustrating Once a composite test scenario is created, it may be stored for later access or otherwise provided to an end use, where providing includes: causing the data characterizing the generated composite test in an electronic visual display, transmitting the data characterizing the generated composite test to a remote computing system, loading the data characterizing the generated composite test into memory, or storing the data characterizing the generated composite test into physical data storage.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 6:
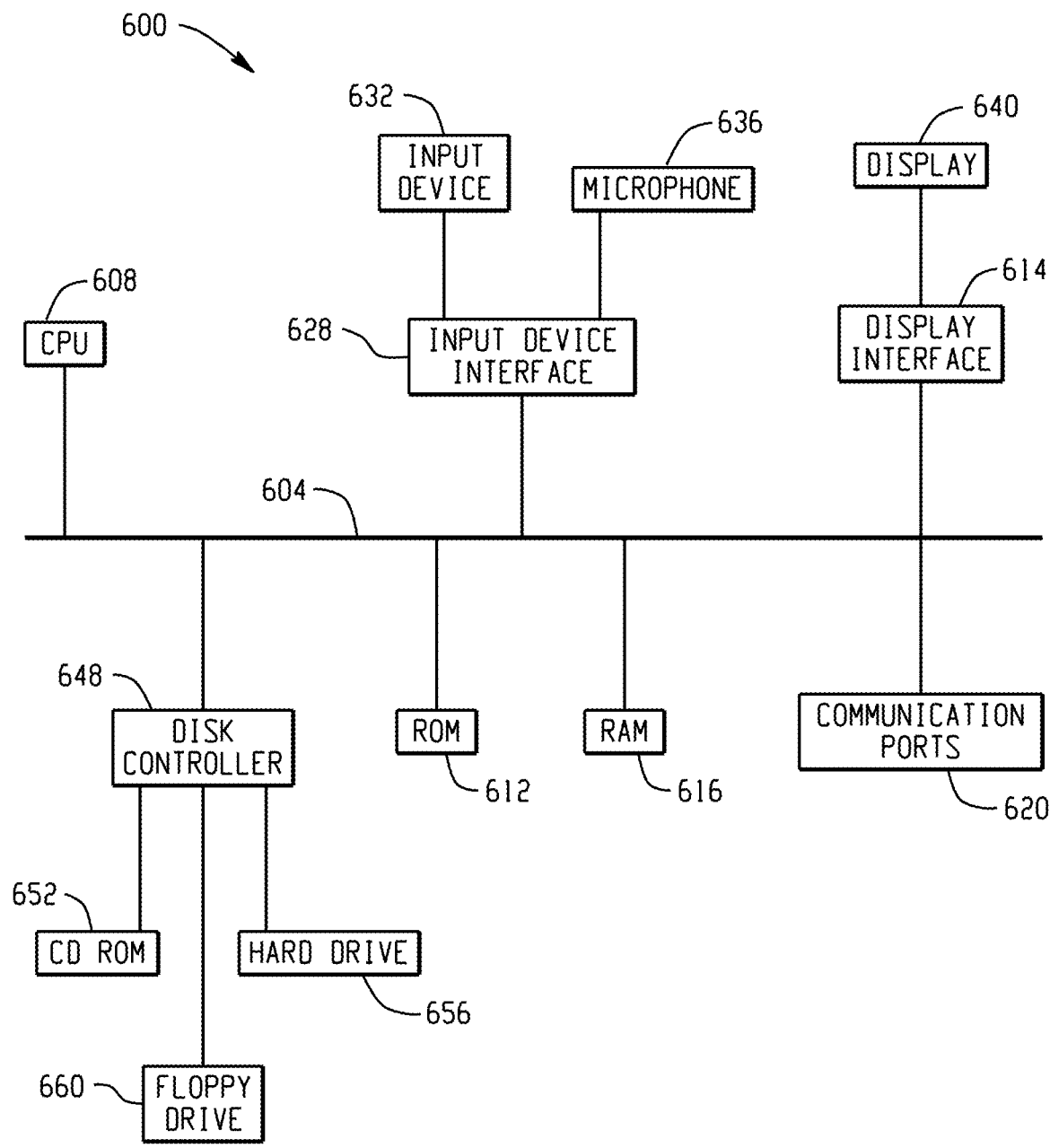
FIG. 6 is a diagram of a computing device for implementing aspects described herein.

FIG. 6 is a diagram illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 624, the input device 632, the microphone 636, and input device interface 628.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for testing a chip package system comprising N processor cores, the method comprising:
receiving a data file characterizing the chip package system;

conducting simulation testing for the N processor cores, wherein a single core is active while all other cores are inactive for each simulation, the conducting simulation testing including:
applying a first set of switching combinations to a first processor core causing a first number of states and capturing first one or more physical characteristics of the behavior of the chip package system in response to the first number of states, wherein the first number of states corresponds to a total number of different states on which the first processor core is tested; and
applying a second set of switching combinations to a second processor core causing a second number of states and capturing second one or more physical characteristics of the behavior of the chip package system in response to the second number of states, wherein the second number of states corresponds to a total number of different states on which the second processor core is tested; and
combining one or more of the first one or more physical characteristics of the behavior of the chip package system with one or more of the second one or more physical characteristics of the behavior of the chip package system to obtain a composite test.

2. The method of claim 1, conducting simulation testing further includes:
generating a computer readable model of the chip package system from the data file;
storing the first one or more physical characteristics in a data store;
storing the second one or more physical characteristics in the data store.

3. The method of claim 1, wherein the simulations are linearly superimposed or the simulations are non-linearly combined.

4. The method of claim 1 further comprising:
conducting simulation testing such that all N cores are inactive to result in a further simulation to form part of the combined simulations.

5. The method of claim 1, wherein the simulation testing varies different logic for the chip package system and includes at least one leakage analysis.

6. The method of claim 1, wherein the simulation testing runs through different switching time combinations for the chip package system.

7. The method of claim 1 further comprising:
calculating peak to peak voltages for each simulation.

8. The method of claim 1 further comprising:
determining for each core a level of noise associated with each of a plurality of states.

9. The method of claim 1, wherein the multiple processor cores form part of a single processor.

10. The method of claim 1, wherein the multiple processor cores form part of two or more processors.

11. The method of claim 1, wherein the multiple processor cores form part of a chip package system.

12. The method of claim 1, wherein the data file is a value change dump (VCD) file, a logical netlist, or a layout file.

13. The method of claim 1 further comprising generating a composite test by selectively combining portions of each simulation output.

14. The method of claim 13 further comprising:
providing data characterizing the generated composite test.

15. The method of claim 14, wherein the providing data comprises at least one of: causing the data characterizing the generated composite test in an electronic visual display, transmitting the data characterizing the generated composite test to a remote computing system, loading the data characterizing the generated composite test into memory, or storing the data characterizing the generated composite test into physical data storage.

16. The method of claim 1, wherein the conducted simulation testing includes generating simulation outputs comprising simulated behaviors associated with criteria selected from a group consisting of: simultaneous switching current localization, power grid weakness, current supply congestion, or timing critical path impact, electrical conductivity to nearest package bump, power density, thermal density, change in demand current over time, component sensitivity to noise, number of logic gates, number of memory cell switching, number of cell switching, or whether every block is activated.

17. A system for testing a chip package system comprising N processor cores comprising:
at least one data processor; and
memory storing instructions which, when executed by the at least one data processor, cause the at least one data processor to:
receive a data file characterizing the chip package system;
conduct simulation testing for the N processor cores, wherein a single core is active while all other cores are inactive for each simulation, the conducting simulation testing including:
applying a first set of switching combinations to a first processor core causing a first number of states and capturing first one or more physical characteristics of the behavior of the chip package system in response to the first number of states, wherein the first number of states corresponds to a total number of different states on which the first processor core is tested; and
applying a second set of switching combinations to a second processor core causing a second number of states and capturing second one or more physical characteristics of the behavior of the chip package system in response to the second number of states, wherein the second number of states corresponds to a total number of different states on which the second processor core is tested; and
combine one or more of the first one or more physical characteristics of the behavior of the chip package system with one or more of the second one or more physical characteristics of the behavior of the chip package system to obtain a composite test.

18. The system of claim 17, wherein when executed the instructions further cause the at least one data processor to:
generate a computer readable model of the chip package system from the data file;
store the first one or more physical characteristics in a data store;
store the second one or more physical characteristics in the data store.

19. A non-transitory computer program product for testing a chip package system comprising N processor cores, the non-transitory computer program product storing instructions which, when executed by at least one data processor forming part of at least one computing device, cause the at least one computing device to:
receive a data file characterizing the chip package system;
conduct simulation testing for the N processor cores, wherein a single core is active while all other cores are inactive for each simulation, the conducting simulation testing including:

applying a first set of switching combinations to a first processor core causing a first number of states and capturing first one or more physical characteristics of the behavior of the chip package system in response to the first number of states, wherein the first number of states corresponds to a total number of different states on which the first processor core is tested; and applying a second set of switching combinations to a second processor core causing a second number of states and capturing second one or more physical characteristics of the behavior of the chip package system in response to the second number of states, wherein the second number of states corresponds to a total number of different states on which the second processor core is tested; and combine one or more of the first one or more physical characteristics of the behavior of the chip package system with one or more of the second one or more physical characteristics of the behavior of the chip package system to obtain a composite test.

20. The non-transitory computer program product of claim 19, wherein the instructions, when executed, further cause the at least one computing device to:

generate a computer readable model of the chip package system from the data file;

store the first one or more physical characteristics in a data store;

store the second one or more physical characteristics in the data store.

* * * * *